Sept. 3, 1963  R. W. ARMSTRONG ET AL  3,102,703
AUTOMATIC TRIM CONTROL SYSTEM FOR TOWED AIRCRAFT
Filed Aug. 13, 1962                                              4 Sheets-Sheet 1

INVENTORS.
RAY W. ARMSTRONG
PETER F. GIRARD
IVAN CLINKENBEARD
BY
Knox & Knox

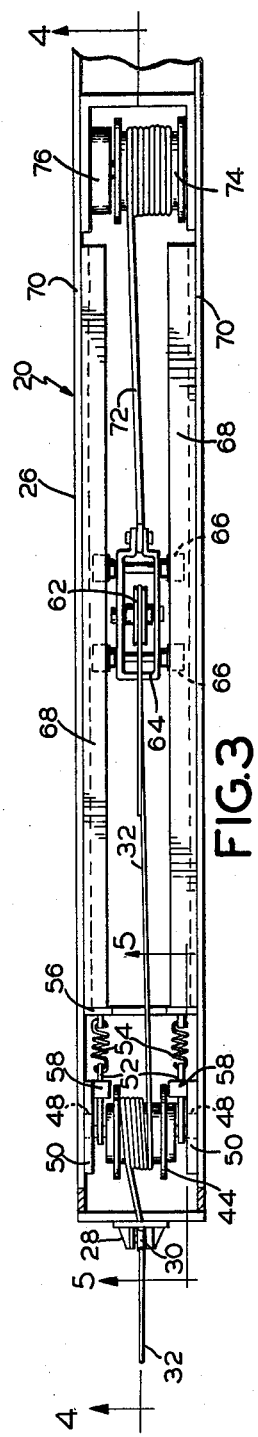
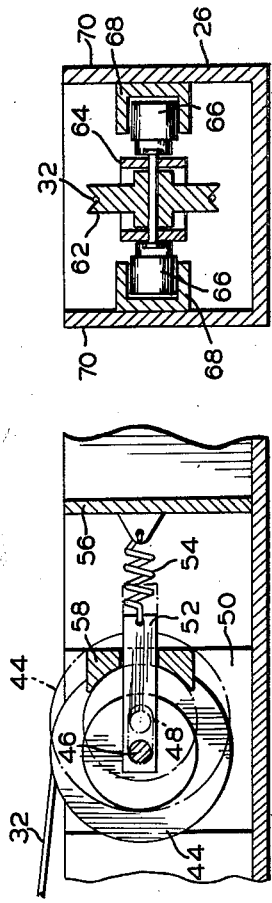
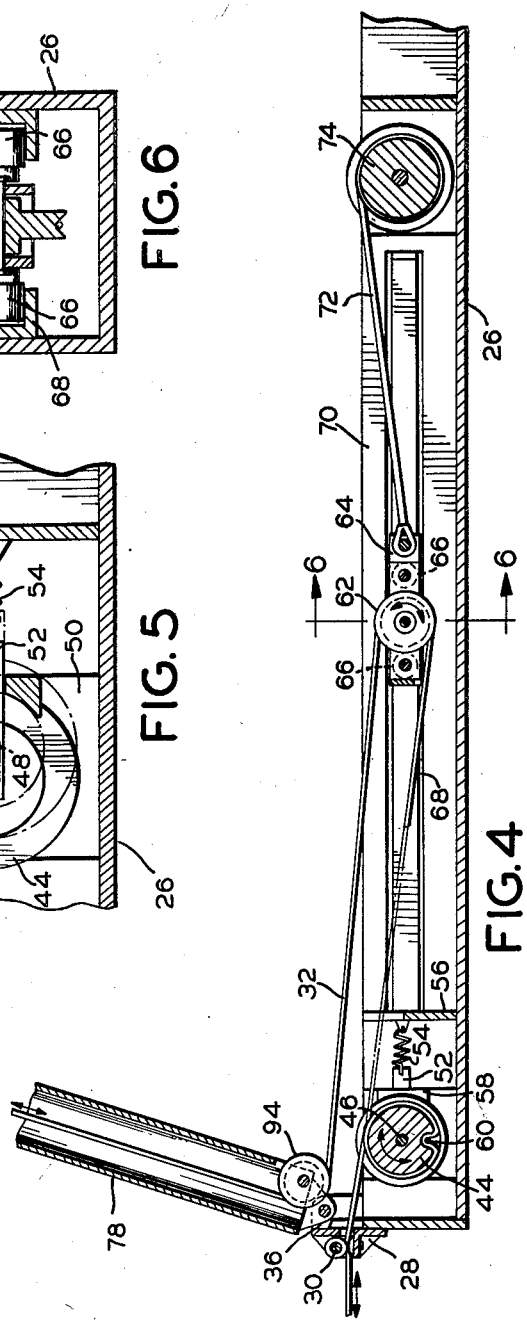

INVENTORS.
RAY W. ARMSTRONG
PETER F. GIRARD
IVAN CLINKENBEARD
BY Knox & Knox

INVENTORS.
RAY W. ARMSTRONG
PETER F. GIRARD
IVAN CLINKENBEARD

BY  Knox & Knox

United States Patent Office 3,102,703
Patented Sept. 3, 1963

3,102,703
AUTOMATIC TRIM CONTROL SYSTEM FOR TOWED AIRCRAFT
Ray W. Armstrong, Alpine, Peter F. Girard, La Mesa, and Ivan L. Clinkenbeard, El Cajon, Calif., assignors to The Ryan Aeronautical Co., San Diego, Calif.
Filed Aug. 13, 1962, Ser. No. 216,515
12 Claims. (Cl. 244—3)

The present invention relates generally to aircraft controls and more particularly to an automatic trim control system for towed aircraft.

The system is primarily adaptable to unmanned towed aircraft, such as cargo carrying gliders, which must be maintained in a reasonably constant position relative to the towing aircraft. A towed glider carrying a particular load will maintain constant altitude at a specific speed. If the speed increases the glider will rise due to increased lift and will sink if speed decreases. Thus some means is necessary to adjust the lift of the glider in accordance to the speed of the towing aircraft to avoid unnecessary oscillation of the glider. Also, in an unmanned glider, it is desirable to have some control after release from the towing aircraft, in order that the glider may be flown to a selected landing site and then landed properly with the cargo undamaged.

The primary object of this invention, therefore, is to provide a trim control system for a towed aircraft, such as an unmanned cargo glider, the system being capable of adjusting the trim and controlling the lift in such a manner as to maintain the glider at a constant altitude relative to the towing aircraft regardless of speed, by utilizing the pull on the towing cable to adjust the trim.

Another object of this invention is to provide a trim control system which automatically locks the towing cable when released from the towing aircraft and is then operable by remote control means to bring the towed aircraft to a safe landing.

Another object of this invention is to provide a trim control system incorporating a terrain contact switch which is trailed from the aircraft and, upon striking the ground or other surface, causes the control system to adjust the trim to proper landing position immediately prior to landing.

A further object of this invention is to provide a trim control system which is entirely contained within the towed aircraft and is compact and of low weight.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 3 is an enlarged sectional view taken on line 3—3 of FIGURE 2;

FIGURE 4 is a sectional view taken on line 4—4 of FIGURE 3;

FIGURE 5 is an enlarged sectional view taken on line 5—5 of FIGURE 3;

FIGURE 6 is an enlarged sectional view taken on line 6—6 of FIGURE 4;

Similar characters of reference indicate similar or identical elements and portions throughout the specification and throughout the views of the drawings.

Structure

Figure 1:
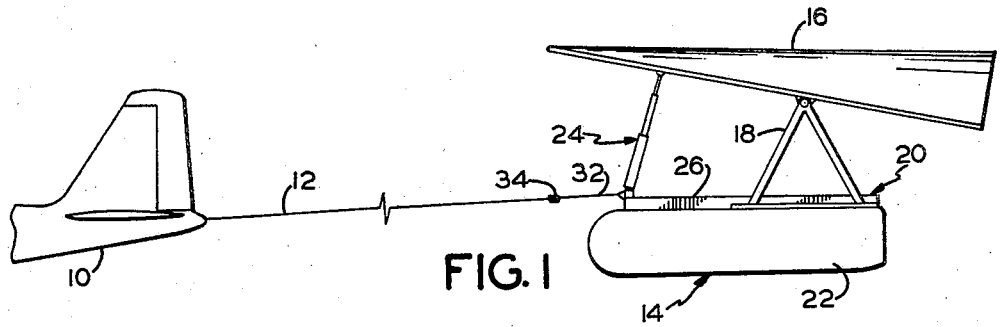
FIGURE 1 is a diagrammatic side elevation view of a towed aircraft and a portion of the towing aircraft.
Figure 2:
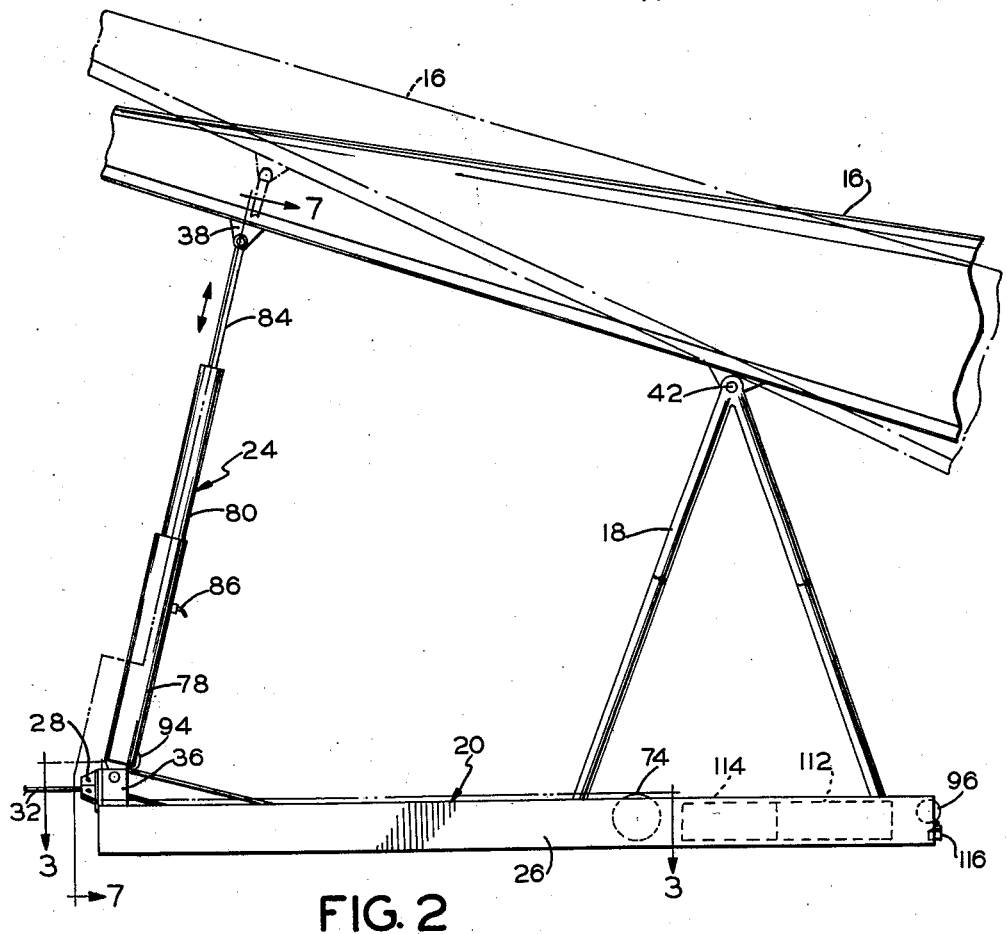
FIGURE 2 is an enlarged side elevation view of the towed aircraft lifting surface and trim control unit.

With reference to FIGURE 1 of the drawings, a towing aircraft, indicated fragmentarily at 10, is coupled by a towing cable 12 to a towed aircraft 14. In this instance the towed aircraft is illustrated as a flexible wing glider wherein the wing 16 is pivotally mounted on a support frame 18 above a control unit 20 and can be attached to various types of cargo containers, such as the container 22. The lift of a flexible wing aircraft is controlled primarily by the angle of attack of the wing and this is controlled by a telescopic strut 24 between the control unit 20 and the wing 16, as described in detail hereinafter. It should be understood that the system is adaptable to more conventional aircraft having small movable control surfaces, but is particularly suitable for flexible wing aircraft since the system is capable of the large control movements necessary for controlling a flexible wing, which is essentially a control surface in its entirety.

The control unit 20 is incorporated into a body member illustrated as an elongated box-like beam 26 which can be attached to the cargo container 22 in any suitable manner, this versatile arrangement making it possible to carry many different types of cargo with a standard wing and control unit. Beam 26 has at its forward end a guide pulley assembly 28 containing multiple pulleys 30 freely rotatable in radially extending planes and meeting at a common center to hold a control cable 32. At the end of control cable 32 is a tow hook 34 for connection to the towing cable 12, the multiple pulleys 30 allowing the control cable to run freely regardless of the direction of pull thereon. Adjacent the pulley assembly 28 is a bracket 36 to which the lower end of telescopic strut 24 is pivotally attached, the upper end of said strut being pivotally attached to a bracket 38 on the central longitudinal keel member 40 of wing 16 forwardly of the pivotal connection 42 to support frame 18.

Immediately behind the guide pulley assembly 28 is an idler reel 44 mounted on a transverse shaft 46 which is journalled in longitudinally elongated slots 48 in bearings 50. Attached to shaft 46 on either side of idler reel 44 are tie bars 52 connected by springs 54 to a fixed plate 56, the springs pulling said idler reel rearwardly against fixed brake shoes 58. Ratchet or gear means may be used in place of brake shoes 58, as long as the idler reel 44 is locked against rotation in the rearward position. The control cable 32 passes several times around idler reel 44 and is fixed thereto at one position, as by pin 60 indicated in FIGURE 4. From the idler reel, control cable 32 passes around an adjustment pulley 62 freely rotatably mounted in a pulley block 64, which is longitudinally slidable on rollers 66 riding in opposed tracks 68 fixed to the sides 70 of beam 26. The pulley block 64 is connected to a limit cable 72 wound on a power reel 74 mounted toward the rear end of beam 26, said power reel being driven by a motor 76. Various types of motors may be used but should be such that the drive shaft will not turn unless power is applied. In other words, power reel 74 does not rotate unless actually being driven. This can be accomplished by brake means operated by the driving power source, such systems being well known in connection with hoists, winches and the like.

Figure 7:
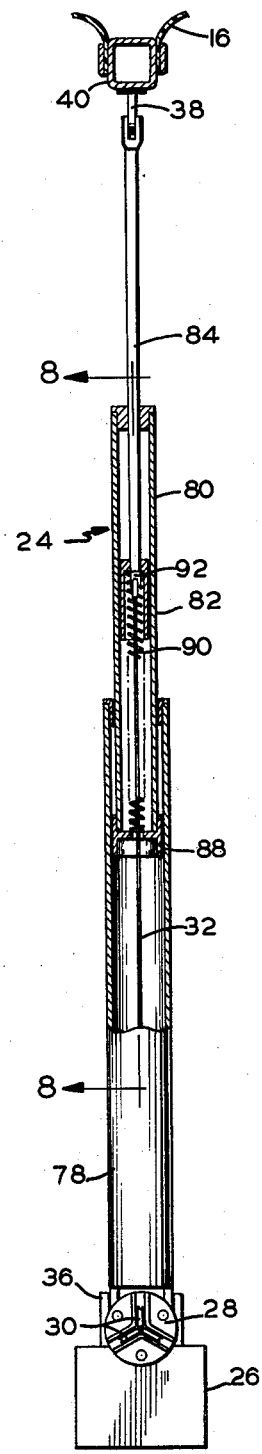
FIGURE 7 is an enlarged sectional view taken on line 7—7 of FIGURE 2.
Figure 8:
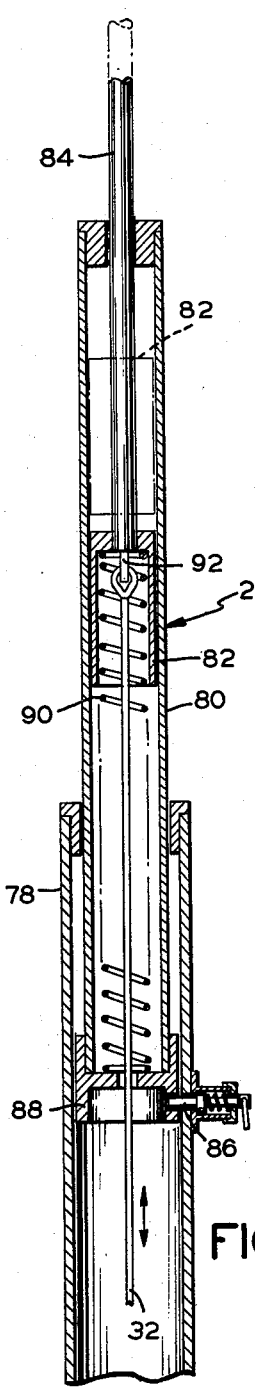
FIGURE 8 is a further enlarged sectional view taken on line 8—8 of FIGURE 7.

The telescopic strut 24, illustrated in detail in FIGURES 7 and 8 comprises an outer sleeve 78, which is attached to lower bracket 36, and an inner sleeve 80 in which is a piston 82, said piston having a piston rod 84 connected to upper bracket 38. When not in use the inner sleeve 80 can be collapsed into outer sleeve 78, but in operation the inner sleeve is held in extended position by a locking pin 86 through the outer sleeve into a reinforced guide member 88 at the lower end of said inner sleeve. Piston 82 is biased upwardly by an extension spring 90 in the inner sleeve 80. At the lower end of piston rod 84 is an eye 92 to which control cable 32 is secured, said control cable extending from adjustment pulley 62, around a freely rotatable pulley 94 at the lower end of outer sleeve 78 and upwardly inside strut 24. It will be seen that a forward pull on the tow hook end of control cable 32 will cause piston rod 84 to be pulled downwardly.

Figure 9:
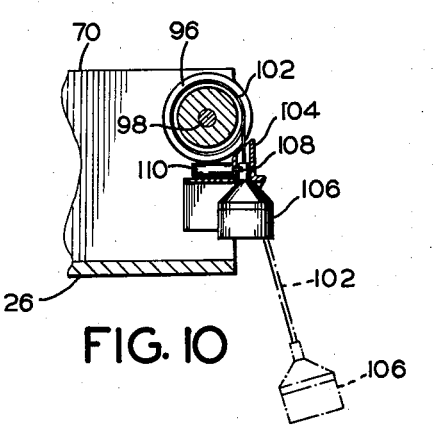
FIGURE 9 is an enlarged rear end elevation view of the trim control unit.
Figure 10:
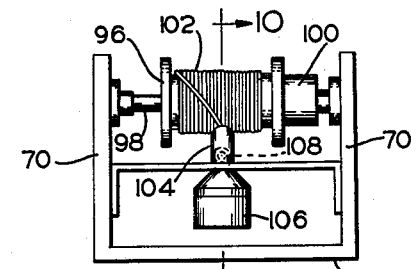
FIGURE 10 is a sectional view taken on line 10—10 of FIGURE 9.

At the rear end of beam 26 is a storage reel 96 mounted on a transverse shaft 98 and held by a friction clutch 100 of suitable type. On the storage reel 96 is wound an electrical cable 102, the free end of which passes through a guide sleeve 104 and carries a terrain contact switch 106, which is held in said sleeve by a detent pin 108, as in FIGURES 9 and 10. Detent pin 108 can be released by a solenoid 110 or similar means to release switch 106. The switch 106 may be an impact switch of which various types are readily available.

Figure 12:
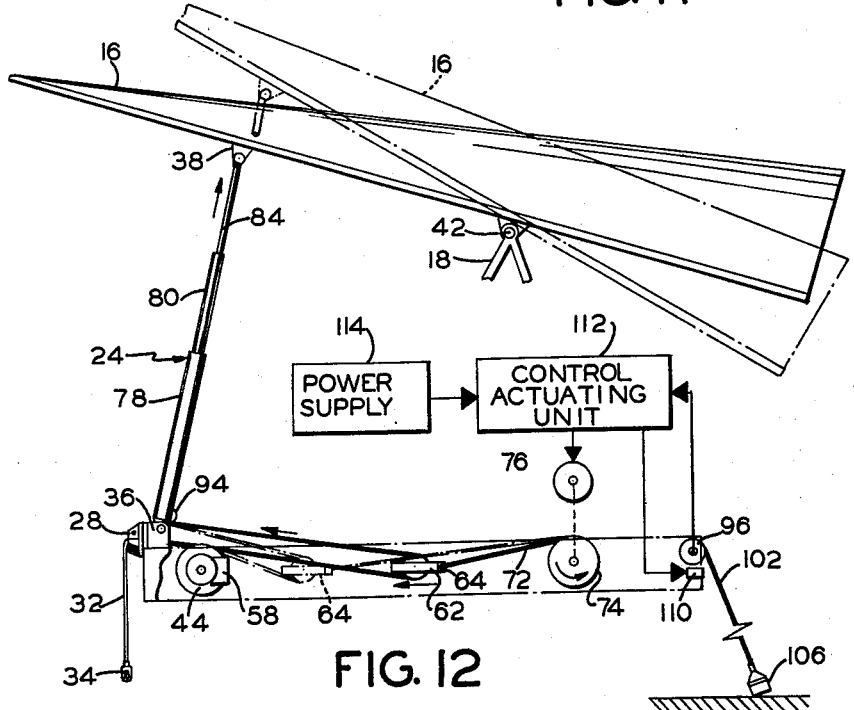
FIGURE 12 is a diagrammatic view of the system in free flight configuration immediately prior to landing.

As illustrated in FIGURE 12, the motor 76 is operated by a control actuating unit 112 from a suitable power supply 114, to turn power reel 74 in either direction. The control actuating unit 112 can be operated by radio control, or a predetermined program, or by any other remote means, many different systems having been developed. The solenoid 110 is operated by control actuating unit 112 and terrain contact switch 106 is connected to the control unit to operate motor 74, as later described in detail.

Operation

Figure 11:
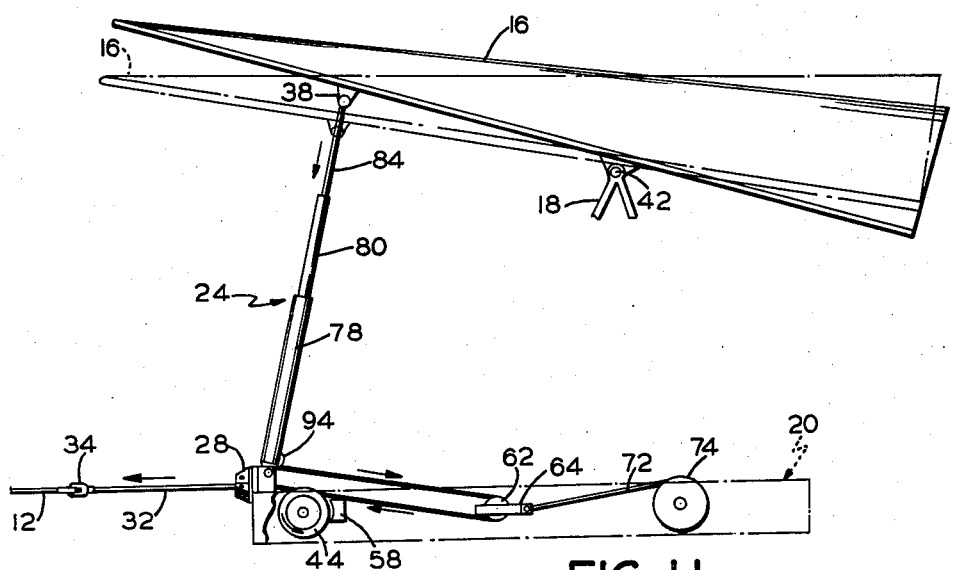
FIGURE 11 is a diagrammatic view of the system in towing configuration.

Referring to FIGURES 4 and 11, which illustrate the disposition of the system during towing, the pulley block 64 is held by limit cable 72 at approximately the center of its range of longitudinal travel. The control cable 32 is under tension from the pull of the towing aircraft, the tension varying as the relative speeds of the towing and towed aircraft vary for various reasons. The tension causes the idler reel 44 to be pulled forward against springs 54 and clear of brake shoes 58, so that the idler reel is free to rotate. If the tension increases due to an increase in speed of the towing aircraft, the control cable 32 will cause the idler reel 44 to rotate, reeling in the cable around pulleys 62 and 94 and pulling the piston rod 84 down, as indicated by directional arrows in FIGURE 11. This action will decrease the angle of attack of the wing 16 and thereby reduces effective lift, so that the towed aircraft does not tend to climb due to the increased speed.

If the towing aircraft reduces speed the tension on control cable 32 is lessened and the piston rod 84 is extended by extension spring 90, so increasing the angle of attack of wing 16. This increases effective lift and allows the towed aircraft to maintain altitude at the reduced speed. It will be evident that the system will accurately follow all fluctuations in speed, the lift of the wing being continually balanced to the towing speed according to the pull of the towing cable. Initial trim, to obtain level flight of the towed aircraft at a particular speed with a particular load, is adjusted by operating motor 76 to turn the power reel 74 and shift the pulley block 64 by means of limit cable 72. This changes the effective length of control cable 32 and changes the angle of attack of wing 16 beyond that held by the towing tension. This trim adjustment is performed by the control actuating unit 112 controlled remotely from the towing aircraft or from the ground.

When the towed aircraft is released the tension on control cable 32 is removed and the springs 54 pull idler reel 44 back against the brake shoes 58, so locking the towing end of said control cable, as indicated in the broken line position in FIGURE 5 and in FIGURE 12. The towed aircraft is then flown as a free glider, the trim being changed by remote operation of the power reel 74, as described above. This could be accomplished by means of radio control equipment adjacent the intended landing site, so that the aircraft could be observed during gliding flight.

For landing, the wing 16 must be flared up to a high angle of attack just prior to touch down. This is performed by actuating the solenoid 110, causing detent pin 108 to release the terrain contact switch 106, which falls by its own weight and unreels cable 102, the speed of unreeling being limited to a reasonable rate by friction clutch 100. The length of the cable 102 is such that the terrain contact switch 106 strikes the landing surface at the proper time to flare wing 16 at the required altitude for a safe landing. Operation of the terrain contact switch 106 starts motor 76 and causes power reel 74 to unwind the limit cable 72, allowing the pulley block 64 to move forwardly so that the piston rod 84 can extend and raise the wing, as indicated by directional arrows and the broken line position on FIGURE 12.

The system is capable of a large range of control movement and is particularly suitable for the flexible wing type of towed aircraft wherein the entire wing is moved as a control surface. However, it should be understood that the system can also be readily adapted to more conventional aircraft, with the telescopic strut, or its equivalent, coupled to small control surfaces such as elevators.

The system provides full altitude or pitch control of a non-powered aircraft or glider during tow and after release, even to the final landing, as opposed to mere stabilizing means used in some types of towed aerial targets. Directional control of towed aircraft of proper aerodynamic design is not problematical during tow, since the towing pull holds the towed aircraft in streamlined position with substantially weathervane stability.

It is understood that minor variation from the form of the invention disclosed herein may be made without departure from the spirit and scope of the invention, and that the specification and drawing are to be considered as merely illustrative rather than limiting.

We claim:
1. An automatic trim control system for towed aircraft, comprising:
   a movable aerodynamic control surface mounted on the aircraft;
   a control unit on the aircraft;
   a control cable extending from said control unit and having means at the extended end thereof for connection to a towing aircraft;
   an adjustment pulley shiftably mounted in said control unit and around which said control cable is passed;
   said control cable being connected at its other end to said control surface, whereby tension on the control cable causes motion of the control surface;
   said control surface being biased against the pull of said control cable;
   and means to shift said adjustment pulley, thereby moving said control surface independently of the tension on said control cable.

2. An automatic trim control system for towed aircraft, comprising:
   a movable aerodynamic control surface mounted on the aircraft;
   a control unit on the aircraft;
   a control cable extending from said control unit and having means at the extended end thereof for connection to a towing aircraft;
   an adjustment pulley shiftably mounted in said control unit and around which said control cable is passed;
   said control cable being connected at its other end to said control surface, whereby tension on the control cable causes motion of the control surface;
said control surface being biased against the pull of said control cable;
means to shift said adjustment pulley, thereby moving said control surface independently of the tension on said control cable;
and means to shift said adjustment pulley to a predetermined position immediately prior to landing to move said control surface to landing position.

3. An automatic trim control system for towed aircraft comprising:
a movable aerodynamic control surface mounted on the aircraft;
a control unit on the aircraft;
a control cable extending from said control unit and having means at the extended end thereof for connection to a towing aircraft;
an adjustment pulley shiftably mounted in said control unit and around which said control cable is passed;
said control cable being connected at its other end to said control surface, whereby tension on the control cable causes motion of the control surface;
said control surface being biased against the pull of said control cable;
means to shift said adjustment pulley, thereby moving said control surface independently of the tension on said control cable;
and means to lock the extended end of said control cable against further movement after disconnection from the towing aircraft.

4. An automatic trim control system for towed aircraft, comprising:
a movable aerodynamic control surface mounted on the aircraft;
a control unit on the aircraft;
a control cable extending from said control unit and having means at the extended end thereof for connection to a towing aircraft;
an idler reel rotatably mounted in said control unit on which said control cable is wound and secured;
brake means engageable with said idler reel;
said idler reel having limited sliding freedom and being held clear of said brake means by tension on said control cable;
an adjustment pulley shiftably mounted in said control unit around which said control cable is passed;
said control cable being connected at its other end to said control surface, whereby tension on the control cable causes motion of the control surface;
said control surface being biased against the pull of said control cable;
and means to shift said adjustment pulley, thereby moving said control surface independently of the tension on said control cable.

5. An automatic trim control system for towed aircraft, comprising:
a movable aerodynamic control surface mounted on the aircraft;
a control unit on the aircraft;
a control cable extending from said control unit and having means at the extended end thereof for connection to a towing aircraft;
an idler reel rotatably mounted in said control unit on which said control cable is wound and secured;
brake means engageable with said idler reel;
said idler reel having limited sliding freedom and being held clear of said brake means by tension on said control cable;
an adjustment pulley shiftably mounted in said control unit around which said control cable is passed;
said control cable being connected at its other end to said control surface, whereby tension on the control cable causes motion of the control surface;
said control surface being biased against the pull of said control cable;
said adjustment pulley being slidable in said control unit;
and powered drive means connected to said adjustment pulley to slide the pulley and thereby cause movement of said control surface independently of the tension in said control cable.

6. An automatic trim control system for towed aircraft, comprising:
a movable aerodynamic control surface mounted on the aircraft;
a control unit on the aircraft;
a control cable extending from said control unit and having means at the extended end thereof for connection to a towing aircraft;
an idler reel rotatably mounted in said control unit on which said control cable is wound and secured;
brake means engageable with said idler reel;
said idler reel having limited sliding freedom and being held clear of said brake means by tension on said control cable;
an adjustment pulley shiftably mounted in said control unit around which said control cable is passed;
said control cable being connected at its other end to said control surface, whereby tension on the control cable causes motion of the control surface;
said control surface being biased against the pull of said control cable;
said adjustment pulley being slidable in said control unit;
powered drive means connected to said adjustment pulley to slide the pulley and thereby cause movement of said control surface independently of the tension in said control cable;
and terrain contacting means connected to said drive means to shift said adjustment pulley to a predetermined position immediately prior to landing, causing movement of said control surface to a landing position.

7. An automatic trim control system for towed aircraft comprising:
a movable aerodynamic control surface mounted on the aircraft;
a control unit on the aircraft;
a control cable extending from said control unit and having means at the extended end thereof for connection to a towing aircraft;
an idler reel rotatably mounted in said control unit on which said control cable is wound and secured;
brake means engageable with said idler reel;
said idler reel having limited sliding freedom and being held clear of said brake means by tension on said control cable;
an adjustment pulley shiftably mounted in said control unit around which said control cable is passed;
a telescopic strut coupled to said control surface for movement thereof;
said control cable being connected at its other end to said telescopic strut, whereby tension on the control cable causes motion of said control surface;
said telescopic strut being biased against the pull of said control cable;
said adjustment pulley being slidable in said control unit;
powered drive means connected to said adjustment pulley to slide the pulley and thereby cause movement of said control surface independently of the tension in said control cable;
and terrain contacting means connected to said drive means to shift said adjustment pulley to a predetermined position immediately prior to landing, causing movement of said control surface to a landing position.

8. A trim control system according to claim 7 wherein said control unit is contained in a body member for attachment to a cargo container;

said aerodynamic surface comprising a lifting wing mounted on said body member.

9. An automatic trim control system for towed aircraft, comprising:
   a control unit having an elongated body member;
   a lifting wing movably mounted on said body member;
   a telescopic strut connected between said body member and said wing and being operable to change the angle of attack of the wing;
   a control cable extending from the forward end of said body member and having means on the extended end thereof for coupling to a towing aircraft;
   the other end of said towing cable being connected to said telescopic strut, thereby causing movement of said wing corresponding to tension on the control cable;
   and means to adjust said control cable and move said wing independently of the tension on the control cable.

10. An automatic trim control system for towed aircraft, comprising:
    a control unit having an elongated body member;
    a lifting wing movably mounted on said body member;
    a telescopic strut connected between said body member and said wing and being operable to change the angle of attack of the wing;
    a control cable extending from the forward end of said body member and having means on the extended end thereof for coupling to a towing aircraft;
    a rotatable idler reel on which said control cable is wound and secured adjacent the forward end of said body member;
    the other end of said control cable being connected to said telescopic strut, thereby causing movement of said wing corresponding to tension on the control cable;
    brake means to lock said idler reel against rotation when the tension on the extended end of said control cable is released;
    and means to adjust said control cable and move said wing independently of the tension on the control cable.

11. A trim control system according to claim 10, wherein said means to adjust said control cable comprises on adjustment pulley around which the control cable is passed;
    said adjustment pulley being longitudinally slidably mounted in said body member;
    and power driven adjustment means connected to said adjustment pulley for longitudinal movement thereof.

12. A trim control system according to claim 11 and including a terrain contacting switch releasably held on said body member;
    a cable connected to said switch;
    release means to release said switch for trailing below said body member;
    said switch being connected to said power driven adjustment means and being operable on contact with a terrain surface to move said control cable to a predetermined position and thereby move said wing to a landing angle of attack.

References Cited in the file of this patent
UNITED STATES PATENTS

| | | |
|---|---|---|
| 2,898,058 | Del Mar | Aug. 4, 1959 |
| 2,912,191 | Millam | Nov. 10, 1959 |